(12) United States Patent
Lin et al.

(10) Patent No.: US 11,743,339 B2
(45) Date of Patent: Aug. 29, 2023

(54) TEMPORAL ASPECTS OF CENTRALIZED MANAGEMENT OF THE EXECUTION OF CONNECTED SERVICES OF A VEHICLE

(71) Applicant: PSA AUTOMOBILES SA, Poissy (FR)

(72) Inventors: Trista Lin, Villemeux sur Eure (FR); Xiaoting Li, Maurepas (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/012,168

(22) PCT Filed: Jun. 22, 2021

(86) PCT No.: PCT/FR2021/051131
§ 371 (c)(1),
(2) Date: Dec. 21, 2022

(87) PCT Pub. No.: WO2022/013488
PCT Pub. Date: Jan. 20, 2022

(65) Prior Publication Data
US 2023/0199070 A1    Jun. 22, 2023

(30) Foreign Application Priority Data

Jul. 15, 2020   (FR) .................................. 2007398

(51) Int. Cl.
*H04L 67/125*   (2022.01)
*G07C 5/00*    (2006.01)

(52) U.S. Cl.
CPC ............ *H04L 67/125* (2013.01); *G07C 5/008* (2013.01)

(58) Field of Classification Search
None
See application file for complete search history.

(56) References Cited

FOREIGN PATENT DOCUMENTS

EP        3226647 A1    10/2017
WO    2017135881 A1    8/2017

OTHER PUBLICATIONS

International Search Report for PCT/FR2021/051131 dated Sep. 14, 2021.
Written Opinion for PCT/FR2021/051131 dated Sep. 14, 2021.

*Primary Examiner* — Abdhesh K Jha
(74) *Attorney, Agent, or Firm* — Sandberg Phoenix & von Gontard, PC

(57) ABSTRACT

The invention relates to managing the execution of services executed by on-board components in a land motor vehicle (VEH) on the basis of generating a summary message (MU) sent at a predetermined frequency.

9 Claims, 4 Drawing Sheets

[Fig 1]
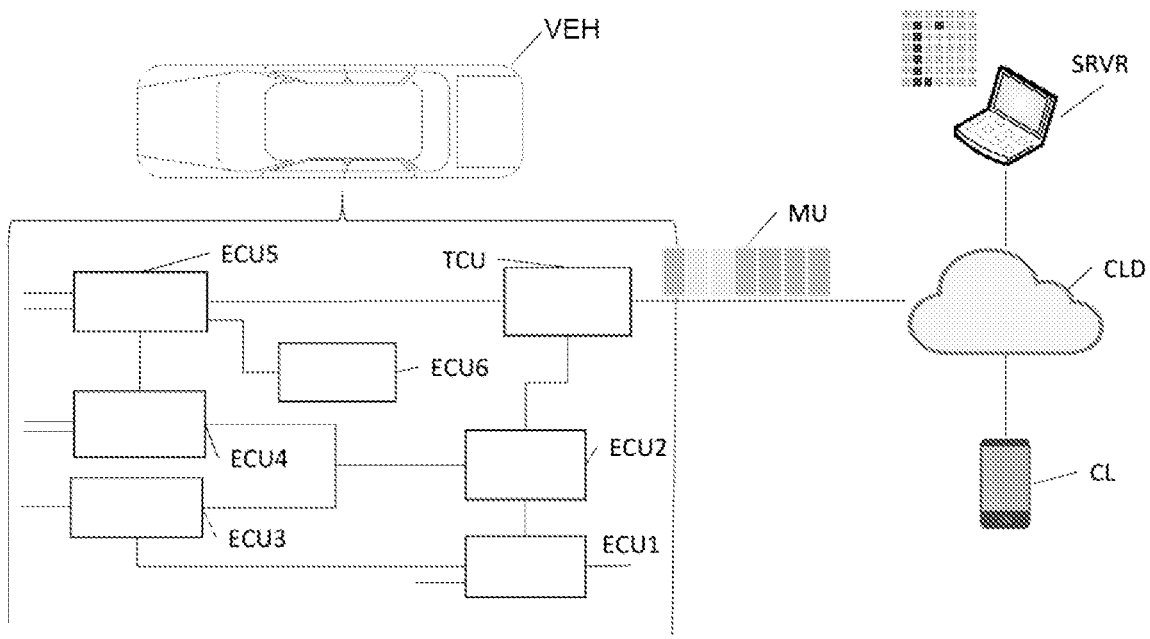

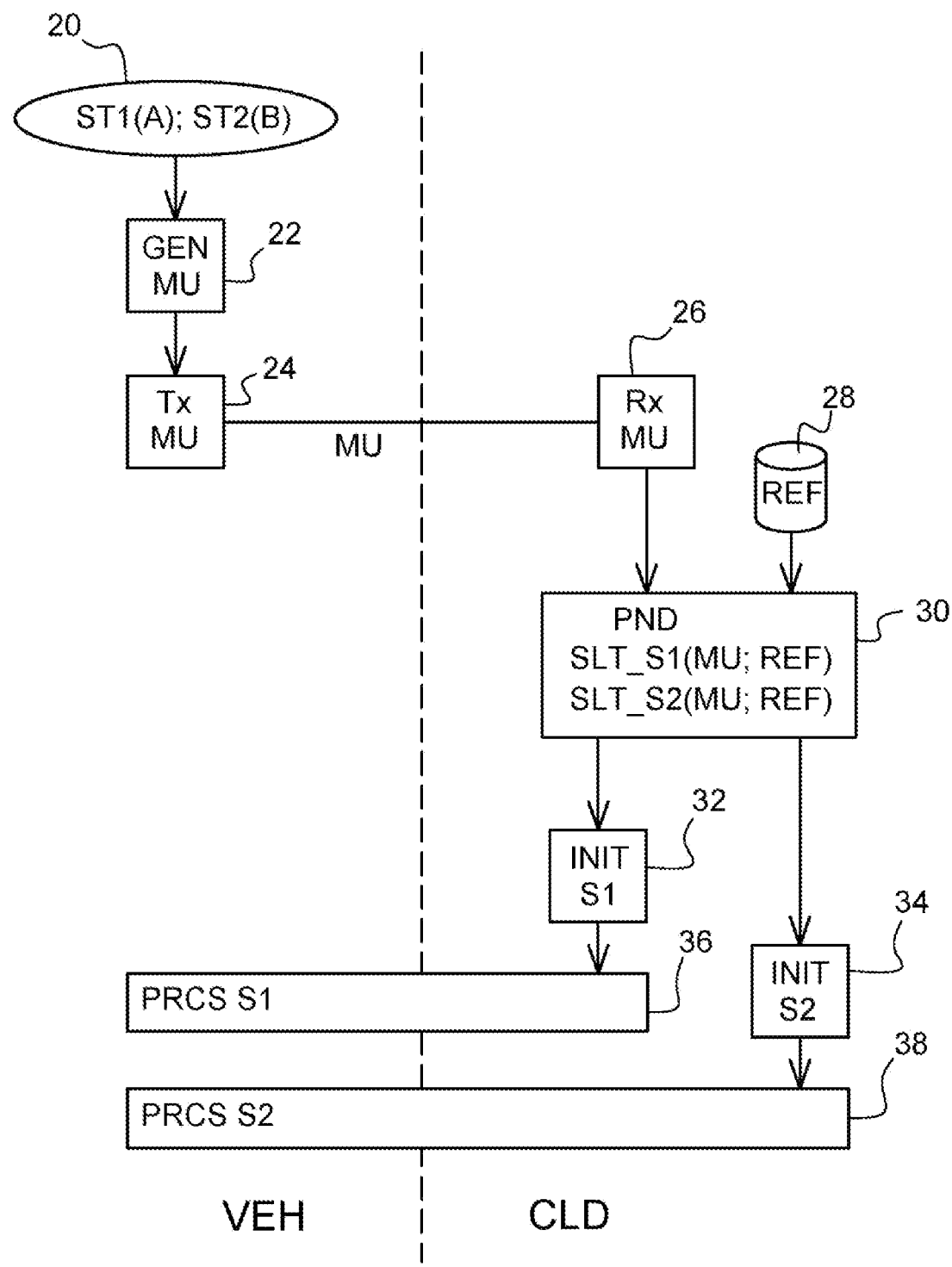

[Fig 3]
| | ST1(A) | ST1(B) | ST2(A) | ST2(B) | ST3(A) | ST3(B) | ST3(C) |
|---|---|---|---|---|---|---|---|
| S7 | OK | MED | MED | OK | N/A | OK | N/A |
| S6 | OK | HOT | OK | HOT | N/A | OK | N/A |
| S5 | OK | HOT | N/A | N/A | OK | N/A | OK |
| S4 | OK | HOT | MED | OK | OK | OK | N/A |
| S3 | OK | HOT | MED | OK | N/A | N/A | N/A |
| S2 | OK | MED | OK | MED | OK | OK | OK |
| S1 | OK | HOT | HOT | OK | OK | N/A | OK |
[Fig 4]
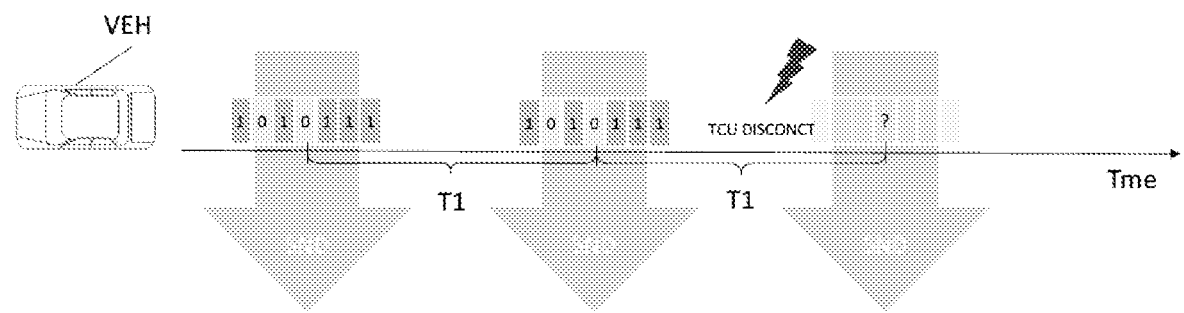

[Fig 5]
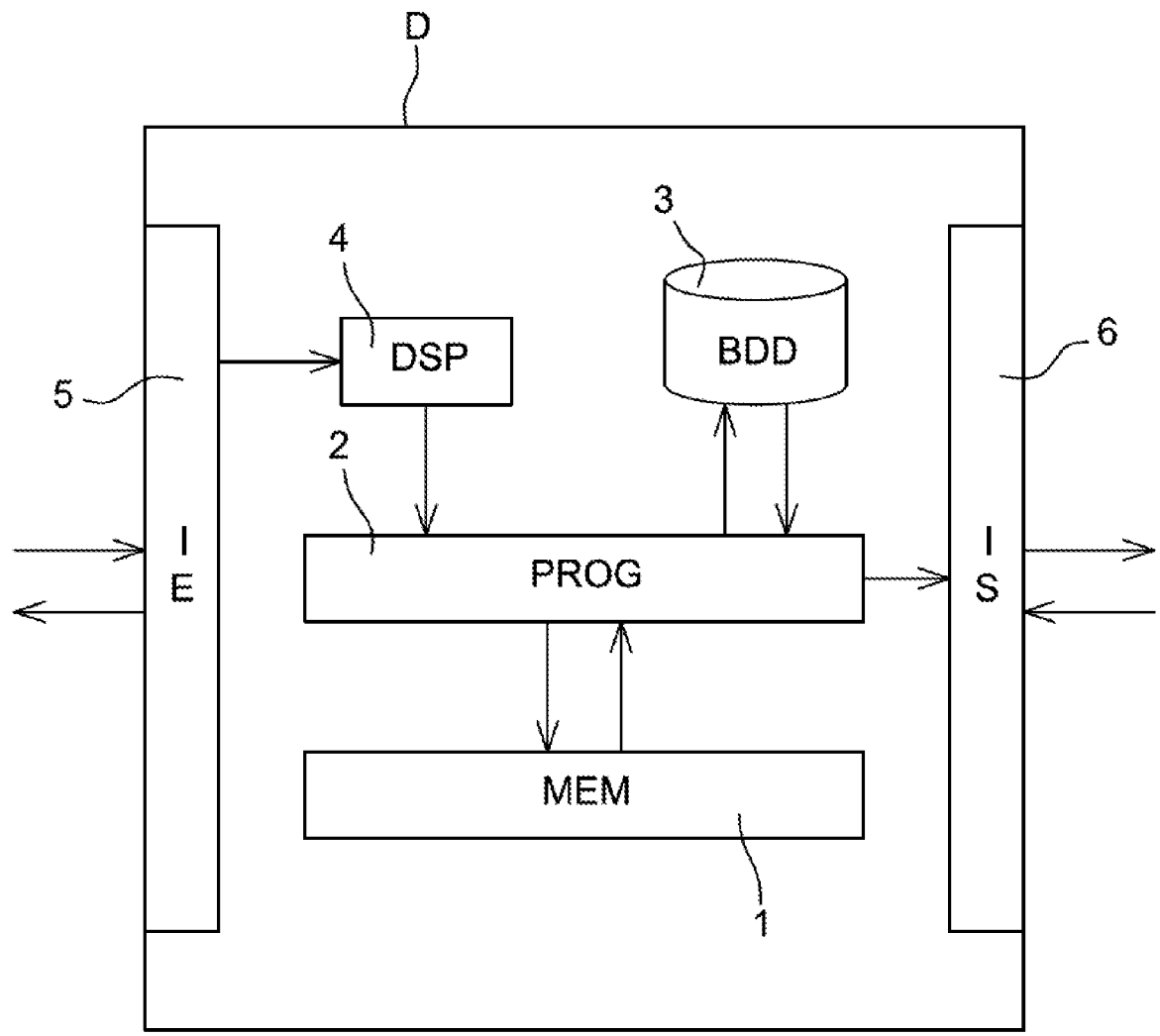

TEMPORAL ASPECTS OF CENTRALIZED MANAGEMENT OF THE EXECUTION OF CONNECTED SERVICES OF A VEHICLE

CROSS-REFERENCE TO RELATED APPLICATIONS

This application is the US National Stage under 35 USC § 371 of International Application No. PCT/FR2021/051131, filed Jun. 22, 2021 which claims the priority of French application 2007398 filed on Jul. 15, 2020, the content (text, drawings and claims) of both said applications being incorporated herein by way of reference.

BACKGROUND

The system disclosed herein belongs to the field of on-board electronics in a land motor vehicle. In particular, it concerns managing the execution of connected services of a vehicle.

The term "land motor vehicle" means any type of vehicle such as a motor vehicle, a moped, a motorcycle, a storage robot in a warehouse, etc.

"Service implemented by a vehicle" means any type of service made available to any element of the vehicle by any process executed by at least one electronic component. Updating a vehicle's computer, executing autonomous driving software using environmental data transmitted by radio frequency communication to the vehicle, the broadcasting of audio or video content by means of an infotainment system, remote unlocking of the vehicle, etc. are examples of services implemented by the vehicle.

To be correctly executed, many services of a vehicle must be implemented under very specific conditions. Some services, such as downloading high-definition maps for autonomous driving or broadcasting video content, require a high throughput connection from the server to the vehicle, while others are less demanding in terms of throughput but require the vehicle to be moving (collecting data to feed a remote database, for example a meteorological database) or that an internal network of the specific vehicle is available.

Currently, each service operates independently. This means in particular that a service which must be executed but for which certain conditions are not met will implement a predetermined number of execution retries until timing out.

These attempts have deleterious effects on the operation of the on-board electronic components in the vehicle. In particular, the component in charge of connectivity, the telematic control unit (TCU), can be quickly saturated by the requests for data exchange with remote entities of all the services performing retries. These retries also overload the internal networks (CAN, Ethernet) of the vehicle.

Furthermore, the schedule for transmitting the attempts may be inconsistent with respect to the state of the vehicle, the remote resources required, or the execution of other services requiring the same resources. Thus, the probability of services timing out is high.

There is therefore a need to rationalize managing the execution of the services implemented by a vehicle.

SUMMARY

Disclosed is a system to improve the situation.

To this end, a first aspect of the disclosed system relates to a method for managing the implementation of a first and a second service in a vehicle by means of a remote server, the method being implemented by the remote server and comprising the steps of:
  receiving a summary message comprising an item of information on a state of a first functional parameter of the vehicle and an item of information on a state of a second functional parameter of the vehicle, such a summary message being received at a predetermined frequency;
  for each reception of a summary message, identifying a possibility of implementing the first service and the second service in the vehicle from the summary message and a predetermined reference of correspondence between services and states of the vehicle;
  upon identification of the possibility of implementing the first service, transmitting to the vehicle a request for executing the first service in a first implementation window, the first implementation window corresponding to a first multiple of the period corresponding to the predetermined frequency;
  upon identification of the possibility of implementing the second service, transmitting to the vehicle a request for executing the second service in a second implementation window, the second implementation window corresponding to a second multiple of the period corresponding to the predetermined frequency.

Thus, in the disclosed system, the temporal management of the execution of the services is rationalized.

A deterministic and centralized schedule of retry procedures is implemented. Each service adheres to this schedule comprising implementation windows and the repeated retry procedures are eliminated.

In particular, by restricting the implementation of the services to windows corresponding to multiples of the period for sending the summary message, it is possible to limit in time the number of messages linked to retries and, at the same time, to check by receiving new summary messages that the functional parameters remain in states compatible with the execution of the service.

"Window corresponds to a multiple of a period" means that the duration of the window corresponds to a multiple of the period.

In one embodiment, the first and the second multiple are equal to one.

In one embodiment, the method further comprises the steps of:
  detecting a loss of connection with the vehicle when no summary message is received for a third multiple of the period corresponding to the predetermined frequency;
  upon detection of the loss of connection, generating a first and/or a second service inhibition message.

Thus, when a loss of connection is detected, no attempt interferes with the various networks required for implementing the services.

In one embodiment, the first, the second and the third multiple are equal to one.

In one embodiment, the state of the first functional parameter of the vehicle is:
  i. a state of connecting a telematics control unit of the vehicle to a network external to the vehicle;
  ii. a state of moving or immobilizing the vehicle; or
  iii. a state of operation or inactivity of a network internal to the vehicle.

In one embodiment, the state of the second functional parameter of the vehicle is:
  i. a state of connecting a telematics control unit of the vehicle to a network external to the vehicle;

ii. a state of moving or immobilizing the vehicle; or iii. a state of operation or inactivity of a network internal to the vehicle.

A second aspect of the disclosed system relates to a method for managing the implementation of a first and a second service in a vehicle, the method being implemented by a device included in the vehicle and comprising the steps of:

acquiring an item of information on a state of a first functional parameter of the vehicle and an item of information on a state of a second functional parameter of the vehicle;

generating a summary message comprising the item of information on the state of the first functional parameter of the vehicle and the item of information on the state of the second functional parameter of the vehicle;

transmitting the summary message to a remote server at a predetermined frequency;

receiving a request for executing the first service in a first implementation window corresponding to a first multiple of the period corresponding to the predetermined frequency, and/or receiving a request for executing the second service in a second implementation window, the second implementation window corresponding to a second multiple of the period corresponding to the predetermined frequency;

executing the execution request.

A third aspect of the disclosed system relates to a computer program comprising instructions for implementing the method according to the first or the second aspect of the disclosed system when these instructions are executed by a processor.

A fourth aspect of the disclosed system relates to a management device included in a remote server for implementing a first and a second service in a vehicle, the device comprising at least one processor and one memory arranged to perform the operations of:

receiving a summary message comprising an item of information on a state of a first functional parameter of the vehicle and an item of information on a state of a second functional parameter of the vehicle, a summary message being received at a predetermined frequency;

for each reception of a summary message, identifying a possibility of implementing the first service and the second service in the vehicle from the summary message and a predetermined reference of correspondence between services and states of the vehicle;

upon identification of the possibility of implementing the first service, implementing the first service with the vehicle transmitting to the vehicle a request for executing the first service in an implementation window, the implementation window corresponding to a first multiple of the period corresponding to the predetermined frequency;

upon identification of the possibility of implementing the second service, transmitting to the vehicle a request for executing the second service in a second implementation window, the second implementation window corresponding to a second multiple of the period corresponding to the predetermined frequency.

A fifth aspect of the disclosed system relates to a device for managing the implementation of a first and a second service in a vehicle, the device comprising at least one processor and one memory arranged to perform the operations of:

acquiring an item of information on a state of a first functional parameter of the vehicle and an item of information on a state of a second functional parameter of the vehicle;

generating a summary message comprising the item of information on the state of the first functional parameter of the vehicle and the item of information on the state of the second functional parameter of the vehicle;

transmitting the summary message to a remote server at a predetermined frequency;

receiving a request for executing the first service in a first implementation window corresponding to a first multiple of the period corresponding to the predetermined frequency, and/or receiving a request for executing the second service in a second implementation window, the second implementation window corresponding to a second multiple of the period corresponding to the predetermined frequency;

executing the execution request.

A sixth aspect of the disclosed system relates to a vehicle configured to comprise the device according to the fifth aspect of the disclosed system.

DESCRIPTION OF THE FIGURES

Other features and advantages of the disclosed system will become apparent on examination of the detailed description that follows and from the drawings, in which:

FIG. 1 is a diagram showing the context of the disclosed system;

FIG. 2 is a diagram showing the steps of a method of the system;

FIG. 3 is a diagram showing a reference of the system;

FIG. 4 is a diagram showing the timing aspects of the method;

FIG. 5 shows the structure of a device.

DETAILED DESCRIPTION

The system is described below in its non-limiting application in the case of a motor vehicle comprising seven electronic components. Other applications are naturally possible. For example, the method can be implemented for a motorcycle comprising twelve electronic components or even by an electric scooter comprising two electronic components.

FIG. 1 shows an application context according to one embodiment.

A motor vehicle VEH comprises seven electronic components. Of these seven components, the VEH comprises six computers, ECU1, ECU2, ECU3, ECU4, ECU5, ECU6 and a telematic control unit (TCU).

The TCU is the component in charge of connectivity, and is therefore responsible for exchanging data with remote entities. Thus, it makes possible communications with a CLD network comprising for example a user device CL, such as a mobile telephone, and with a remote server SRVR.

As will be detailed below with reference to FIG. 2, and in particular in steps 20 and 22, the TCU generates a summary message MU from information on the states of functional parameters of the vehicle, this information being itself collected from data transmitted by the electronic components ECU1, ECU2, ECU3, ECU4, ECU5, ECU6 and by the TCU.

The server SRVR comprises a predetermined reference REF of correspondence between services and the states of the vehicle. As detailed in step 30 of FIG. 2, the reference REF is configured to identify services that can be implemented according to states of the functional parameters of the vehicle.

FIG. 2 shows a method.

The steps represented in FIG. 2 are implemented within the vehicle VEH or by an element of the CLD network, such as the server SRVR.

In a step 20, an item of information ST1(A) on a state A of a first functional parameter ST1 of the vehicle VEH and an item of information ST2(B) on a state B of a second functional parameter ST2 of the vehicle are acquired. For the purpose of concise and readable explanations, reference is made here only to two functional parameters but many other parameters can be taken into account, as will be shown by FIG. 3 and detailed below in step 30.

In particular, in one embodiment, the information ST1(A) and ST2(B) are obtained by the TCU from data received from at least one of the computers ECU1, ECU2, ECU3, ECU4, ECU5, ECU6 and by the TCU itself.

For example, a functional parameter may be the availability of a network internal to the vehicle (for example a network specific to the infotainment system), the information on the availability being obtained by components, ECU3 and ECU4 for example, which are responsible for managing such a network.

In another example, the functional parameter may be a movement speed of the vehicle; the parameter can then take the moving state or the stationary state. The status information can in this example be obtained by the TCU from data transmitted by a wheel sensor ECU5 or a satellite positioning system ECU6. In the following, it is considered that ST2 corresponds to this functional parameter example: movement speed of the vehicle, and that state B corresponds to a stationary vehicle.

In another example, the functional parameter may be the availability of a connection with the CLD network or with any other network. The state taken may be disconnected, connected or bad connection. The information is then directly available at the TCU. In the following, it is considered that ST1 corresponds to this functional parameter example: availability of a TCU connection, and that state A corresponds to a connected state.

In a step 22, a summary message MU comprising the item of information ST1(A) on the state of the first functional parameter of the vehicle and the item of information ST2(B) on the state of the second functional parameter of the vehicle is generated by the TCU.

Thus, the TCU here plays the role of centralizing state information, which it collects and aggregates in a single summary message.

In a step 24, the MU is sent by the TCU to the CLD network.

In one embodiment, the MU is generated and sent periodically, at a predetermined frequency. The predetermined period is for example one millisecond, one second, ten seconds, thirty seconds, one minute, five minutes or even one hour. In FIG. 4, the period is represented by T1 on the time axis Tme; the summary message MU is therefore sent every T1.

In a step 26, the MU is received by the CLD network.

In a step 30, the identification of a possibility of implementing a first service S1 and a second service S2 in the vehicle VEH from the summary message MU and the predetermined reference REF of correspondence between services and states of the vehicle is carried out.

S1 and S2 correspond to any type of service made available to any element of the vehicle VEH by any process executed by at least one electronic component, such as ECU1, ECU2, ECU3, ECU4, ECU5, ECU6 or even TCU. Updating a computer of a vehicle, executing autonomous driving software using environmental data transmitted by radio frequency communication to the vehicle, the broadcasting of audio or video content by means of an infotainment system, remote unlocking of the vehicle, etc. are examples of services implemented by the vehicle.

The reference REF is shown in FIG. 3

The REF is represented in FIG. 3 in the form of a table (it can be coded according to any other format, such as instructions understandable in a particular computer language) in which the columns correspond to the states (A, B or C) of functional parameters (ST1, ST2 or ST3) of the vehicle and the service lines S1, S2, S3, S4, S5, S6 and S7.

Each possible state for each functional parameter is assigned as many boxes as there are possible services. In each of these boxes, the following can be mentioned:
  OK: the service is possible for this state;
  NOK: the service is impossible for this state;
  N/A: the service is not affected by this state;
  MED: the service is possible with a degraded execution for this state.

In the present example, the MU informs the CLD of a connection of the TCU (ST1(A)) and of a stationary vehicle (ST2(B)). The REF then indicates that the service S1 can be implemented since ST1(A) and ST2(B) are compatible with S1 (OK boxes). Similarly, the REF indicates that S2 can be executed in a degraded manner since ST1(A) is possible with S2 but ST2(B) is only possible in a degraded manner (MED box). In the following, only these services S1 and S2 will be detailed.

In a particular embodiment, the identification step 30 comprises the sub-steps of:
  extracting information on the states of the first and second parameters from the summary message MU;
  extracting in a sub-step 28 the predetermined reference from a database connected to the remote server;
  comparing information states to reference states to identify the services that can be implemented with the information states.

In a particular sub-embodiment, the comparison step is implemented in the same process of the same computer program for the first and the second service.

In a step 32, upon identification of the possibility of implementing the first service (possible service in the present example), a request for executing the first service in a first implementation window of the first service is transmitted to the vehicle and then executed with the vehicle in a step 36. The first implementation window corresponds to a first multiple of the period corresponding to the predetermined frequency.

Thus, for example, it may be a question of executing an update of a physical or software component of the TCU.

In a step 34, upon identification of the possibility of implementing the second service (service possible in a degraded manner in the present example), a request for executing the second service in a second implementation window of the second service is transmitted to the vehicle and then executed with the vehicle in a step 38. Thus, for example, it may be a question of executing a calibration of a positioning system.

The second implementation window corresponds to a second multiple of the period corresponding to the predetermined frequency.

In a simple embodiment, the first, the second and the third multiple are equal to one. Thus, at each period, it is verified that the service(s) can still be implemented.

In other embodiments, the choice of the multiple is adapted to the service concerned. A long service can thus be implemented for two, three, five, ten, fifty or even one hundred periods.

In one embodiment, the choice of the multiple is determined dynamically from the reception of previous summary messages and from a reception history of summary messages, at least (the vehicle location history can also be used).

In one embodiment, the method further comprises the steps of:
detecting a loss of connection with the vehicle when no summary message is received for a third multiple of the period corresponding to the predetermined frequency;
upon detection of the loss of connection, generating a first and/or a second service inhibition message.

For example, in FIG. 4, when it is detected that the communication with the TCU is broken, TCU DISCONCT, the implementation of the services can be inhibited, even when the service is still in its implementation window.

In one embodiment, the implementation windows of the first and second services correspond to a single predetermined window. The single predetermined window typically corresponds to a multiple, three or four times for example, of the period used for sending the summary message MU. The single predetermined window can also correspond to one millisecond, one second, ten seconds, thirty seconds, one minute, five minutes or even one hour.

In another embodiment, the windows for implementing the first and second services are separate and specific to the service concerned.

FIG. 5 represents an example of device D included in the vehicle VEH, in the network CLD or in the server SRVR. This device D can be used as a centralized device in charge of at least certain steps of the method described above with reference to FIG. 2. In one embodiment, it corresponds for example to the TCU. In another embodiment, it corresponds to a sub-device included in the server SRVR.

This device D can take the form of a box comprising printed circuits for any type of computer or even for a smartphone.

The device D comprises a read/write memory 1 for storing instructions for the implementation by means of a processor 2 of at least one step of the methods as described above. The device also comprises a mass memory 3 for storing data that are intended to be kept after the method has been implemented.

The device D may further comprise a digital signal processor (DSP) 4. This DSP 4 receives data in order to format, demodulate, and amplify these data in a manner that is inherently known.

The device also comprises an input interface 5 for receiving data implemented by the methods and an output interface 6 for transmitting data implemented by the method.

The object of the present disclosure is not limited to the embodiments described above by way of example, but rather it extends to other variants.

Thus, an embodiment corresponding to an exemplary electronic architecture (seven electronic components, etc.) for a motor vehicle has been described. The object of the present disclosure is also applicable to other electronic architectures (different number of components and/or software, etc.).

The invention claimed is:

1. A method for managing an implementation of a first and a second service in a vehicle (VEH) by means of a remote server, the method being implemented by the remote server and comprising the steps of:
receiving a summary message comprising an item of information on a state of a first functional parameter of the vehicle and an item of information on a state of a second functional parameter of the vehicle, the summary message being received at a predetermined frequency;
for each received summary message (MU), identifying a possibility of implementing the first service and the second service in the vehicle from the summary message and a predetermined reference (REF) of correspondence between the first and second services and the vehicle states;
upon identification of the possibility of implementing the first service, transmitting to the vehicle a request for executing the first service in a first implementation window, the first implementation window corresponding to a first multiple of the period corresponding to the predetermined frequency;
upon identification of the possibility of implementing the second service, transmitting to the vehicle a request for executing the second service in a second implementation window, the second implementation window corresponding to a second multiple of the period corresponding to the predetermined frequency.

2. The method according to claim 1, further comprising the steps of:
detecting a loss of connection with the vehicle when no summary message is received for a third multiple of the period corresponding to the predetermined frequency;
upon detection of the loss of connection, generating a first and/or a second service inhibition message.

3. The method according to claim 1, wherein the state of the first functional parameter of the vehicle is:
a state of connecting a telematics control unit of the vehicle to a network external to the vehicle;
a state of moving or immobilizing the vehicle; or
a state of operation or inactivity of a network internal to the vehicle.

4. The method according to claim 1, wherein the state of the second functional parameter of the vehicle is:
a state of connecting a telematics control unit of the vehicle to a network external to the vehicle;
a state of moving or immobilizing the vehicle; or
a state of operation or inactivity of a network internal to the vehicle.

5. A method for managing the implementation of a first and a second service in a vehicle, the method being implemented by a device included in the vehicle and comprising the steps of:
acquiring an item of information on a state of a first functional parameter of the vehicle and an item of information on a state of a second functional parameter of the vehicle;
generating a summary message comprising the item of information on the state of the first functional parameter of the vehicle and the item of information on the state of the second functional parameter of the vehicle;
transmitting the summary message to a remote server at a predetermined frequency;
receiving a request for executing the first service in a first implementation window corresponding to a first multiple of the period corresponding to the predetermined frequency, and/or receiving a request for executing the second service in a second implementation window, the second implementation window corresponding to a second multiple of the period corresponding to the predetermined frequency; and executing the execution request.

6. A computer program comprising instructions for implementing the method according to claim 1 when these instructions are executed by a processor.

7. A management device included in a remote server for implementing a first and a second service in a vehicle, the device comprising at least one processor and one memory arranged to perform the method according to claim 1.

8. A device for managing the implementation of a first and a second service in a vehicle, the device comprising at least one processor and one memory arranged to perform the method according to claim 5.

9. A remote vehicle configured to include the device according to claim 8.

\* \* \* \* \*